(12) United States Patent  (10) Patent No.: US 8,995,104 B2
Li  (45) Date of Patent: Mar. 31, 2015

(54) ELECTRICAL OVER-CURRENT PROTECTION DEVICE

(71) Applicant: Apple Inc., Cupertino, CA (US)

(72) Inventor: Xingqun Li, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/669,077

(22) Filed: Nov. 5, 2012

(65) Prior Publication Data

US 2013/0250465 A1 Sep. 26, 2013

Related U.S. Application Data

(60) Provisional application No. 61/613,379, filed on Mar. 20, 2012.

(51) Int. Cl.
*H02H 5/04* (2006.01)
*H02H 9/02* (2006.01)

(52) U.S. Cl.
CPC ..................... *H02H 9/026* (2013.01)
USPC .......................... 361/103; 361/106

(58) Field of Classification Search
USPC .................................. 361/103, 106
See application file for complete search history.

(56) References Cited

U.S. PATENT DOCUMENTS

| | | | |
|---|---|---|---|
| 4,638,396 A | 1/1987 | Mukli et al. | |
| 5,689,173 A | 11/1997 | Oosaki et al. | |
| 5,714,866 A | 2/1998 | S et al. | |
| 6,300,859 B1 * | 10/2001 | Myong et al. | 337/182 |
| 6,351,361 B1 * | 2/2002 | Kawazu et al. | 361/103 |
| 6,421,216 B1 * | 7/2002 | Myong et al. | 361/103 |
| 6,608,470 B1 | 8/2003 | Oglesbee | |
| 7,538,519 B2 | 5/2009 | Daou et al. | |
| 7,660,096 B2 | 2/2010 | Golubovic et al. | |
| 7,952,330 B2 | 5/2011 | Mori | |
| 2002/0140401 A1 | 10/2002 | Watanabe et al. | |
| 2004/0170887 A1 | 9/2004 | Masumoto et al. | |
| 2006/0215342 A1 | 9/2006 | Montoya et al. | |
| 2009/0027821 A1 | 1/2009 | Colby et al. | |
| 2011/0175700 A1 | 7/2011 | Bourns | |
| 2012/0181988 A1 | 7/2012 | Uchibori | |

OTHER PUBLICATIONS

Non-Final Office Action (dated Oct. 3, 2014), U.S. Appl. No. 13/668,964, filed Nov. 5, 2012, First Named Inventor: Xingqun Li, 13 pages.

* cited by examiner

*Primary Examiner* — Danny Nguyen
(74) *Attorney, Agent, or Firm* — Blakely, Sokoloff, Taylor & Zafman LLP

(57) ABSTRACT

An electrical component package has integrated therein first and second pairs of electrodes, wherein the first pair of electrodes are electrically isolated from the second pair of electrodes. A thermally sensitive positive temperature coefficient (PTC) conductive element abuts the first pair of terminals. Also integrated in the package is an electrical heating element that abuts the second pair of terminals, and receives a drive current for generating heat that is transferred to trip the PTC conductive element. Other embodiments are also described and claimed.

14 Claims, 6 Drawing Sheets

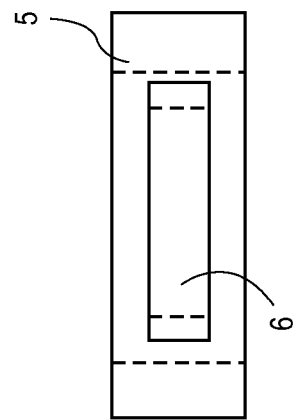
FIG. 3 (TOP VIEW)
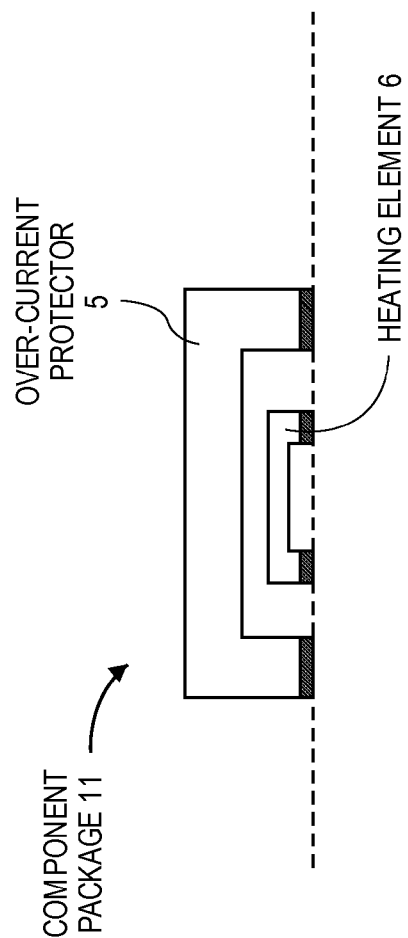
FIG. 2 (SIDE VIEW)
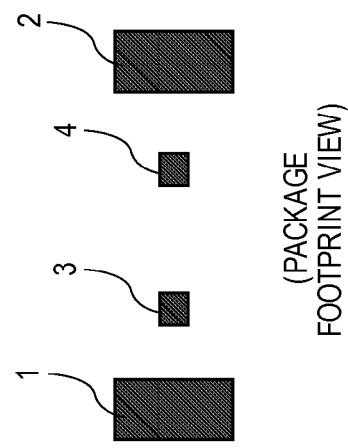
FIG. 4 (PACKAGE FOOTPRINT VIEW)

ELECTRICAL OVER-CURRENT PROTECTION DEVICE

RELATED MATTERS

This application claims the benefit of the earlier filing date of provisional application No. 61/613,379, filed Mar. 20, 2012, entitled "Electrical Over-Current Protection Device."

Some of the subject matter in this application is related to that described in application Ser. No. 13/668,964, "Controlling a Thermally Sensitive over-Current Protector", filed concurrently herewith.

FIELD

An embodiment of the invention relates to thermally sensitive over-current protection devices such as conductive polymer positive temperature coefficient (PTC) elements. Other embodiments are also described.

BACKGROUND

A resettable, thermally sensitive over-current protector element is an electrical device that conducts current in a low resistance state until the current reaches a sufficiently high level, at which time it will drastically change to a high resistance state. This serves to, in effect, choke off the current, thereby offering over-current protection to the source or destination of the current. The device is said to be thermally sensitive in that the transition between low resistance and high resistance occurs when the device is sufficiently heated (due to the increased current). Resettable means that the protector can automatically return to its low resistance state once current through it has dropped to a sufficiently low level and the device has cooled down. An example of such a device is a conductive polymer positive temperature coefficient (PTC) element that drastically changes from a low resistance state to a high resistance state in response to sufficiently high current passing through it. This change in resistance state may be, for example, at least three orders of magnitude.

PTC elements are often used within rechargeable battery packs in order to restrict the battery current, to thereby help protect the battery from an over-current condition. Once the protection specification for the battery has been determined, e.g. the battery should not be allowed to source more than 5 A continuously for five seconds, a suitable PTC element is selected, so that the transition between the low resistance and high resistance states (the transition temperature) corresponds to the desired battery protection specification. Unfortunately, a PTC element by itself is not accurate enough in many instances, in part due to manufacturing process variations. For instance, consider a desired scheme where the battery current should be cut off when it has reached 5 A for five seconds continuously; in practice, the PTC element may not be able to transition into its high resistance state until a substantially longer time interval has elapsed. In other instances, manufacturing variations may cause the PTC element to trip too early. While efforts have been made to more precisely control when an over-current protector is tripped, those techniques are unable to meet more stringent accuracy requirements.

SUMMARY

In accordance with an embodiment of the invention, an electrical over-current protection device has a component package in which are integrated first and second pairs of package terminals, where the first pair is electrically isolated from the second pair. The component package has further integrated therein a resettable thermally sensitive over-current protector that is coupled to the first pair of terminals, and an electrical heating element that is coupled to the second pair of terminals. The over-current protector and the heating element are in proximity to each other, so that when current passing through the heating element is raised to a sufficiently high level, the heat being dissipated by it will thermally trip the over-current protector. The over-current protector may be a conductive polymer PTC element. The electrical heating element may be a resistor. Its resistance may be selected in view of the tripping temperature of the PTC element, the expected thermal efficiency (of the component package) in transferring heat to the over-current protector, and the available current that can be passed through the resistor. Having two pairs terminals or electrodes, where one pair is coupled to the PTC element and the other to the heating element, and where the pairs are electrically isolated from each other, enables particularly accurate control of the tripping of the PTC element.

In one embodiment, the component package is a discrete electronic component package with only four terminals (corresponding to the first and second pairs of package terminals), which may be a surface mount package. In one embodiment, the over-current protector element is larger than and entirely overlays the electrical heating element within the package. In addition, the first pair of terminals (to which the over-current protector is coupled) may be located outward of the second pair of terminals.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 2 is a conceptual side view of a component package having an over-current protector and an integrated heating element.

FIG. 3 is a top view of the component package.

FIG. 4 is a package footprint of the component package.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
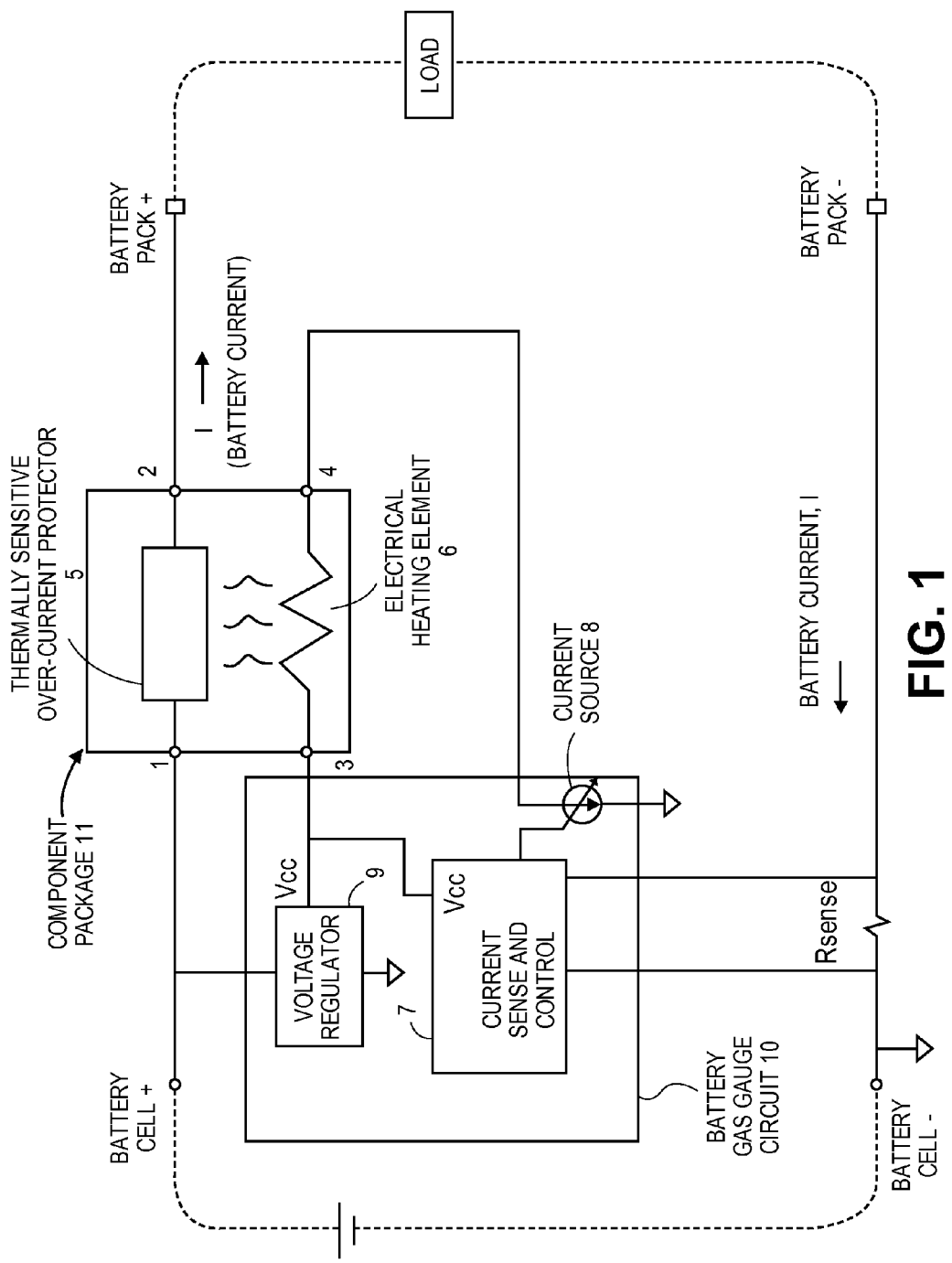
FIG. 1 is a schematic of a circuit for over-current protection.

FIG. 1 is a schematic of a circuit for over-current protection. The over-current protection circuit includes a current sense and control circuit 7 that is coupled to monitor a current, in this example battery current I. The circuit 7 provides a control signal (e.g., a digital signal), which is responsive to the monitored current exceeding a predetermined current threshold, for a predetermined time interval. The circuit 7 may check if a monitored average or dc level of current I exceeds a predetermined threshold, for the entirety of the predetermined time interval; if so, then a control signal is generated that is indicative of whether an over-current condition for the sensed current has occurred.

The control signal is coupled into the control input of a current source circuit 8. The current source circuit 8 may be a controllable (variable) dc current source. The latter is coupled to drive an electrical heating element 6 that is in proximity with a resettable, thermally sensitive, over-current protector 5 (e.g., a PTC element). The current source circuit 8 is designed to raise the current through the electrical heating element 6, in accordance with the control signal received from the current sense and control circuit 7, to a high enough level that causes the over-current protector 5 to trip. The electrical heating element 6 is positioned in close proximity to the over-current protector 5, so as to efficiently transfer heat (due to the current provided by the current source 8) to the over-current protector 5 (and thereby trip the latter). The electrical heating element may be a resistor, e.g. a passive device that is operated non-destructively, such that the entire circuitry can be re-used or is resettable to protect against multiple over-current conditions without having to be re-wired.

Accuracy in tripping the over-current protector 5 may be improved by, for example, enabling the circuit 7 to calculate the total charge that has been delivered by the battery (not shown) in a predetermined time interval. An increased heating element drive current (to be provided by the current source 8) is selected that suddenly causes the heating element 6 to generate enough heat so that the over-current protector 5 is tripped immediately (upon the indication being given by the current sense and control circuit 7 that the maximum amount of charge has been exceeded in the given time interval). Further precision in this process may be achieved by making the current source 8 adjustable or variable, e.g. capable of providing any one of three or more discrete levels of dc current, so that the current sense and control circuit 7 can, if needed, vary the level of the heating element drive current in order to more efficiently control the tripping of the over-current protector 5.

Figure 7:
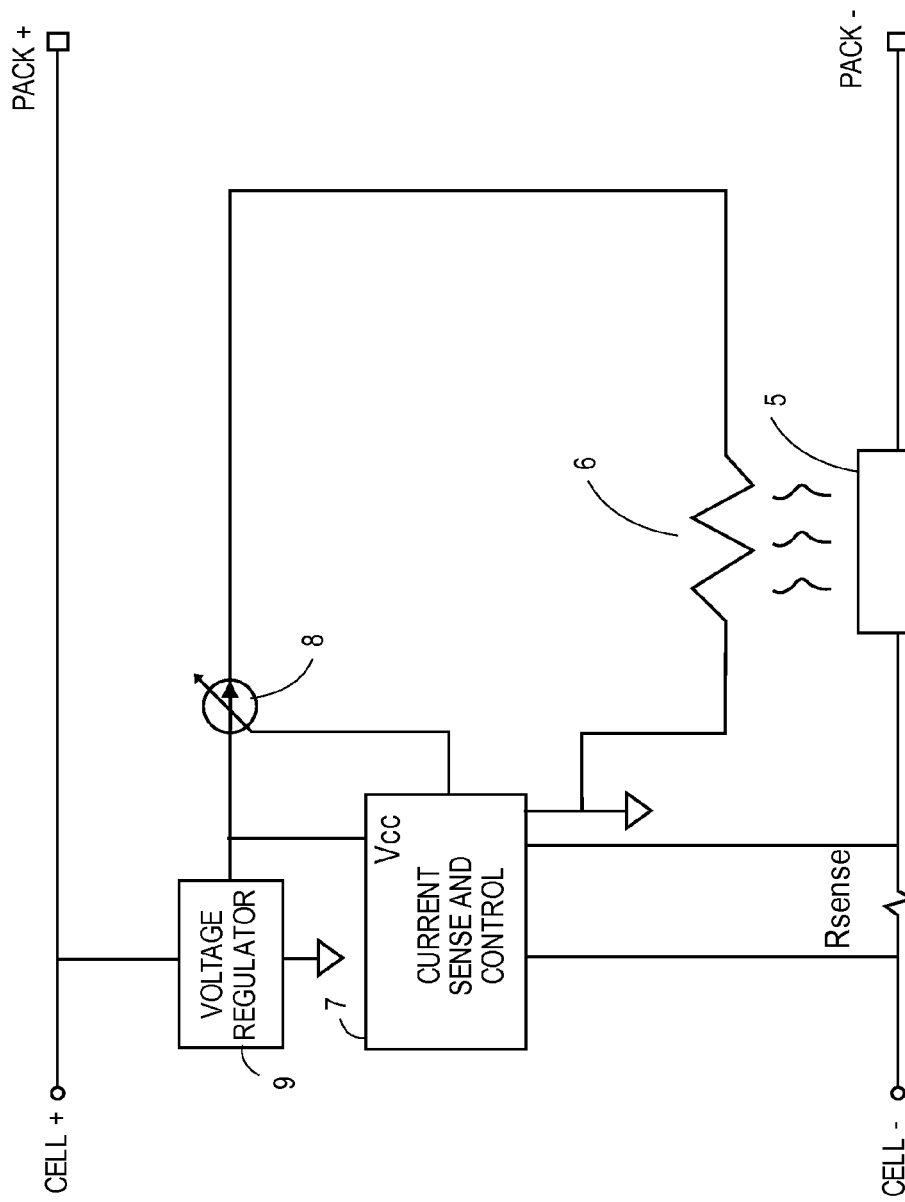
FIG. 7 is a schematic of an over-current protection circuit in which the thermally sensitive over-current protector is in the negative battery rail.

In one embodiment, the current sense and control circuit 7 is able to monitor the current (dc battery current I, in this case) by detecting the voltage across a current sense resistor Rsense that may be in series with the over-current protector 5 as shown. Note that in FIG. 1, while Rsense is located in the negative battery rail, and the over-current protector 5 is located in the positive battery rail, Rsense is nevertheless said to be in series with the over-current protector 5 and the load, because battery current is equal in both the positive and negative battery rails. In contrast, in the embodiment of FIG. 7, both the over-current protector 5 and the Rsense are located (in series) in the negative battery rail. In many instances, the current sense resistor Rsense is coupled between a battery cell terminal and its associated (same polarity) battery pack terminal. It should be understood that there may be multiple cells in a given battery pack. For instance, there may be two or more cells in series, while in other cases there may be two or more cells in parallel. In general, the sense resistor Rsense should be appropriately located so as to conduct the current to be monitored. For reasons given below, locating Rsense in the negative battery rail, as opposed to the positive battery rail, provides particular advantages.

The over-current protection circuit depicted in FIG. 1 may be part of a battery gas gauge circuit 10 that may be embedded within the battery pack, and has a digital communications bus (not shown) through which the gas gauge circuit 10 reports on the health of the battery pack. A voltage regulator 9 (such as a dc-dc regulator) may be provided to step down the battery cell voltage and provide a regulated dc power supply voltage $V_{CC}$ to the current sense and control block 7 (as well as to other circuit elements of the battery gas gauge 10 that are not shown), relative to a power supply return or ground node that may be directly connected to the negative battery cell terminal. The voltage regulator 9 may be coupled at one end to a positive battery terminal (e.g., a positive cell terminal) and at another end to a negative battery terminal (e.g., a negative cell terminal).

Figure 5:
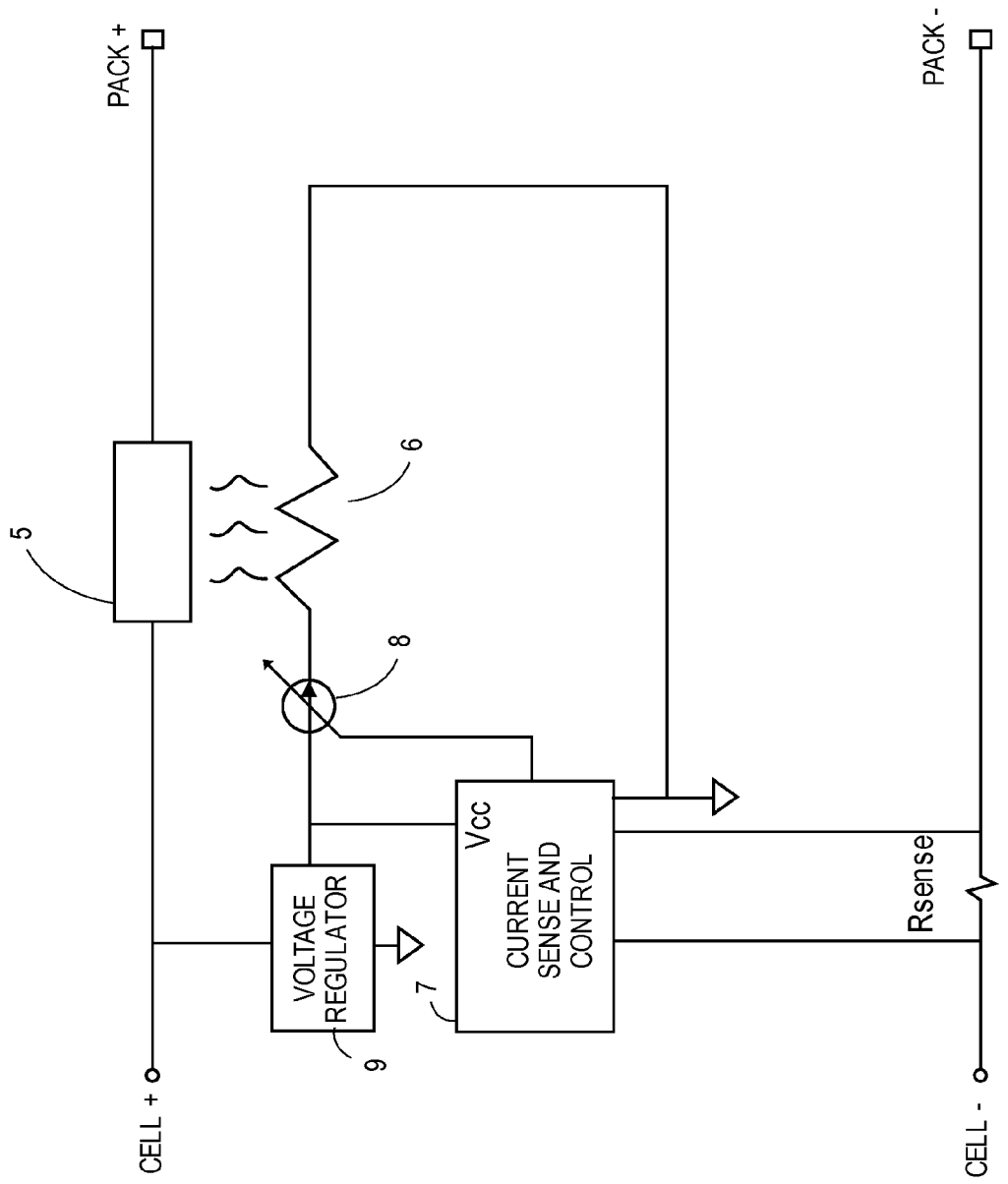
FIG. 5 is a schematic of another circuit for over-current protection, in this case using a high side current source for driving the heating element.

In the embodiment of FIG. 1, the current source 8 is actually a current sink that is coupled on the "low side", at its one end to a power supply return or ground terminal of the gas gauge circuit 10. In this configuration, the current source 8 actually sinks current from the $V_{CC}$ output terminal of the voltage regulator 9. Thus, the term "current source" is used here interchangeably to refer to both a current sink and a current source. The former is actually shown in the schematics of FIG. 5 and FIG. 7, which are alternatives to the circuit of FIG. 1, where the current source 8 is on the "high side", being coupled at its one end to the $V_{CC}$ terminal of the voltage regulator 9.

The battery gas gauge circuit 10 may include a programmable micro controller that implements the functions of the current sense and control block 7, using a combination of analog voltage sensing circuitry (e.g., current sense amplifier), analog-to-digital conversion, and digital signal processing. The latter may serve to analyze the detected (digitized) current sense resistor voltage, in order to make the determination that the monitored current has exceeded the predetermined threshold over the predetermined time interval. The current threshold and the time interval may be set by storing corresponding digital numbers for them in non-volatile memory of the micro controller (not shown).

While FIG. 1 shows several components, in addition to the current sense and control block 7 and the current source 8, this does not mean that all components shown are required in a given embodiment of the invention. For instance, a circuit for over-current protection may only include the current sense and control circuit 7 together with the current source 8, e.g. as part of a battery gas gauge circuit 10; the over-current protector 5 and its associated electrical heating element 6 may be provided by a different entity and need not be part of the gas gauge circuit 10. The current sense and control circuit 7 has the capability to control the current source 8 which is to be coupled to drive the electrical heating element 6 (which is in proximity with the protector 5), and the battery current I being monitored may be the same as the current passing through the over-current protector 5. A given figure may thus depict several embodiments, where each embodiment may be covered by at least a subset of the components shown in the figure.

In a further embodiment, what is shown in FIG. 1 may be part of a battery pack circuit that may be embedded within a battery pack having one or more battery cells. The arrangement shown in FIG. 1 would thus be coupled between a positive battery cell terminal and its adjacent positive pack terminal, and between a negative battery cell and its adjacent negative pack terminal (also referred to here as the battery rails). The battery cell (not shown) may be a typical rechargeable battery cell such as a lithium polymer or lithium ion chemistry cell. Note however that the term "battery" is used here in a generic sense as referring to a supply of electrical energy or power that may or may not be "rechargeable"; the term is thus not limited to electro-chemical conversion devices and instead may refer to, for example, an ultra-capacitor.

Turning now to FIGS. 2-4, an embodiment of the invention as an electrical over-current protection device is shown. The figures depict an electronic component package 11 having integrated therein first and second pairs of package terminals. Referring back to FIG. 1, the first pair of terminals 1, 2 are coupled to the over-current protector 5, while the second pair of terminals 3, 4 are coupled to the electrical heating element 6. The drive current for the heating element 6 comes in through one of the terminals 3, 4 and out the other; similarly, the current of concern (to be choked off in the event of an over-current condition) enters the over-current protector through one of the terminals 1, 2 and exits out the other. In addition, the first pair is electrically isolated from the second pair in the sense that there is essentially an open circuit (very high resistance) across any one of the first pair and any one of the second pair of terminals. The terminals 1-4 may be edge-formed surface mount terminal electrodes, for being soldered to a printed circuit/wiring board (not shown). Their footprint may be as shown in FIG. 4 where it is clear that the first pair of terminals 1, 2 are larger and spaced outward of the smaller, second pair of terminals 3, 4. The surface mount package may be a modification to a conventional surface mount packaged PTC over-current protection element, where the heating element 6 has been added to the bottom of the over-current protector 5, prior to being covered with a protective layer (not shown). The protective layer that covers the PTC layer and the resistive material layer may be a plastic film that exposes only the first and second pairs of terminals or electrodes. This is depicted in the side view of FIG. 2 where the four exposed electrodes are shown as darker or shaded regions. FIG. 2 is a side view of the component package 11, showing in conceptual form the heating element 6 lying entirely below the over-current protector 5. In this case, the over-current protector 5 is larger than and entirely overlays the heating element 6 (see the top view in FIG. 3 which also shows this feature).

As suggested above, the over-current protector 5 may be a layer of conductive polymer PTC material or polymeric PTC material that abuts the first pair of terminals 1, 2 (and not the second pair 3, 4), while the heating element 6 may be a passive resistor, e.g. carbon composition, carbon film, metal film, metal oxide film, thick film, thin film and wirewound. In one embodiment, the component package 11 is formed as a layer of resistive material that abuts the second pair of electrodes 3, 4 (and not the first pair 1, 2) and has been created on an electrically insulating substrate that is also thermally conductive and is sandwiched between a PTC layer on top and the layer of resistive material below. Thus, referring to FIG. 2 and the side view, the electrically insulating substrate that is also thermally conductive would be positioned in the area between the top surface of the heating element 6 and the bottom surface of the over-current protector 5. Example materials for such a substrate include ceramic. Note that the thermal conductivity of the substrate should be maximized, e.g. using a thermally conductive epoxy layer to join the PTC layer with the resistive layer, so as to render the process of tripping the over-current protector 5 more accurate and also more efficient from a power consumption standpoint (due to the need for the heating element driving current).

Figure 6:
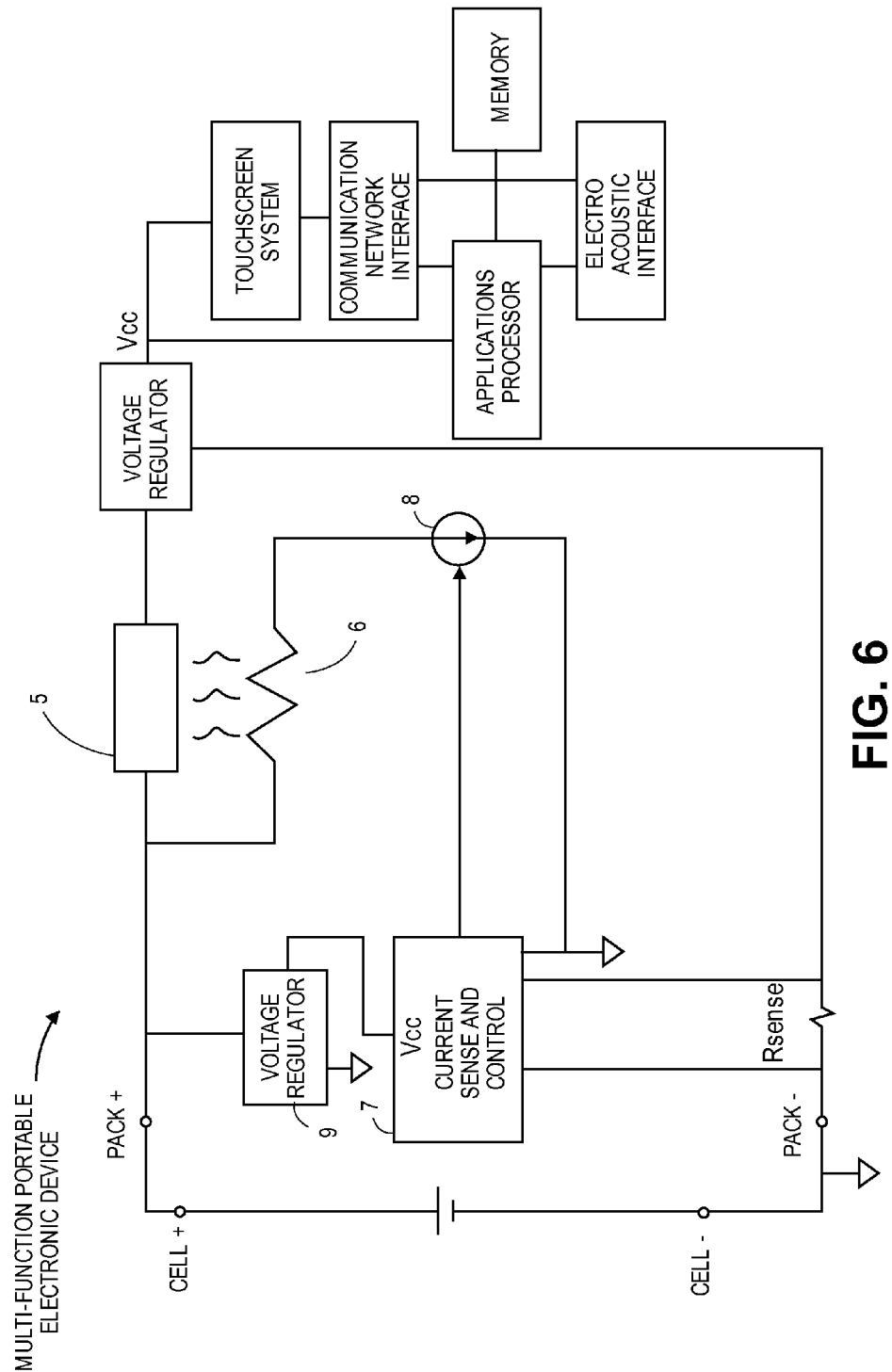
FIG. 6 is a combined block diagram and circuit schematic of a multifunction portable electronic device and another embodiment of a technique for controlling a thermally sensitive over-current protector.

It should also be noted that in the component package 11, as it is depicted in the over-current protection circuit of FIG. 1, there are two pairs of terminals, where the first pair of terminals 1, 2 is electrically isolated from the second pair of terminals 3, 4. As explained above, this arrangement allows for accurate control of the over-current protector 5, by accurately controlling the driving of the electrical heating element 6 using the current source 8 and a separate voltage regulator 9. As an alternative to such a scheme, FIG. 6 shows an embodiment of the over-current protection device that does not need four separate terminals, within the component package 11 (see for example FIG. 1). In this case, the over-current protector 5 and the heating element 6 may share a single electrode or package terminal, which is coupled in this case to a positive battery terminal (either a cell terminal or a pack terminal). The heating element current is thus sourced directly from the battery cell terminal or battery pack terminal, rather than through the voltage regulator 9.

Another embodiment of the invention, which is depicted in FIG. 6, is a multi-function portable electronic device that is being powered by a battery (a single cell battery in this case), through the over-current protection circuit. The portable device may for example be a smart phone, a laptop computer, or a tablet computer. It has a touch screen system, a communications network interface (e.g., to a cellular terrestrial communications network), electro-acoustic transducer interface circuitry (including amplifiers for sensing and driving microphones and speakers), and an applications processor (generically referring to a central processing unit, a system on a chip or other primary computing component) that is coupled to the touch screen, communications network interface and the electro-acoustic transducer circuitry; the processor is programmed to run a touchscreen graphical user interface, a telephony application, and a digital audio player application that may be stored in the non-volatile memory. The battery supplies its battery current, which may power all of these elements.

Figure 8:
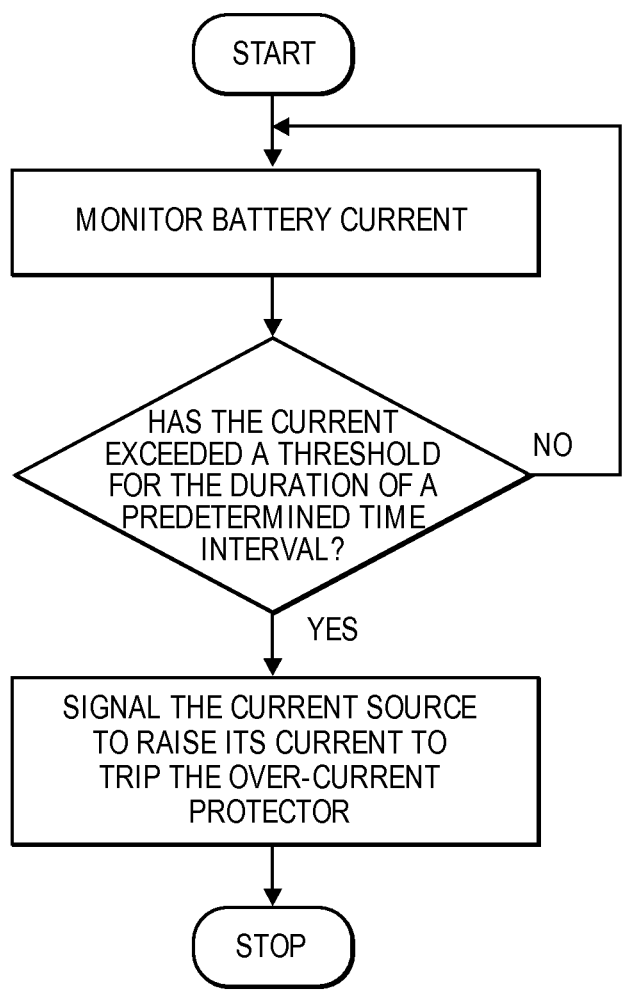
FIG. 8 is a flow diagram of a method for controlling a thermally sensitive over-current protector.

FIG. 8 is a flow diagram of a method for controlling a thermally sensitive over-current protector. The operations of this method may be performed by the current sense and control block 7 described above, for example in the form of operations by a programmed processor (e.g., a microcontroller as part of the gas gauge circuit 10). A battery current is monitored; while monitoring the battery current, determinations are made as to whether or not the monitored current has exceeded a predetermined threshold, e.g. 5 Amperes, during the entirety of a predetermined time interval, e.g. at least one second. When the threshold has been determined to have been exceeded for the duration of the predetermined time interval, then a current source is signaled to raise its current, so as to increase the heat being generated by an electrical heating element that is being driven by the current source thereby tripping the thermally sensitive over-current protector. As described above in connection with the figures, the monitored battery current may be the same as the current through the over-current protector. This process allows more accurate control of how the over-current protector chokes off the battery current, thereby protecting the battery during over-current conditions more consistently across a large number of manufactured specimens of the over-current protector without having to specify, for example, a more accurate PCT element.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the figures show the schematic symbol of a resistor when depicting the electrical heating element 6, this does not mean that the means for conducting current through the second pair of terminals 3,4 and for generating heat that is transferred to the PTC element must, in all instances, be a two terminal passive resistor device. As an alternative, another passive device may be used that can generate sufficient heat in response to electrical current being passed through it and that is re-usable (for multiple over-current conditions). As yet another alternative, an active device may be used, such as a diode or a transistor, which may also be capable of generating the desired heat at a suitable level of drive current. Also, while the figures refer to a battery current being monitored, that is within a battery rail, the over-current protection device and the methodology for controlling an over-current protector may also be used to limit other types of current, such as a current in a signal line or power line of a communications bus. Lastly, while the figures show the use of a sense resistor for monitoring the current, other techniques for obtaining a sufficiently accurate measure of the current are possible, e.g. a Hall effect sensor. The description is thus to be regarded as illustrative instead of limiting.

What is claimed is:

1. An electrical over-current protection device comprising:
a component package having integrated therein
first and second pairs of package terminals, wherein the first pair is electrically isolated from the second pair,
a resettable thermally sensitive over-current protector coupled to the first pair of terminals and having a low resistance state and a high resistance state, wherein the over-current protector is a positive temperature coefficient (PTC) over-current protector element that changes from the low resistance state to the high resistance state in response to sufficiently high current passing through the first pair of terminals, wherein the first and second pairs of terminals remain electrically isolated from each other during both the low resistance state and the high resistance state, and
an electrical heating element coupled to the second pair of terminals, wherein the PTC over-current protector element is larger than and entirely overlays the electrical heating element, and wherein the first pair of terminals, to which the PTC over-current protector are coupled, are located outward of the second pair of terminals.

2. The device of claim 1 wherein the package is a surface mount package.

3. The device of claim 1, wherein the electrical heating element is a resistor.

4. An electrical over-current protection device comprising:
a component package having integrated therein
first and second pairs of electrodes, wherein the first pair is electrically isolated from the second pair,
a layer of thermally sensitive positive temperature coefficient (PTC) conductive polymer abutting the first pair of electrodes,
an electrical heating element abutting the second pair of electrodes, wherein the electrical heating element comprises a layer of resistive material created on an electrically insulating substrate that is also thermally conductive and is between the PTC conductive polymer layer and the layer of resistive material, wherein the first and second pairs of electrodes are electrically isolated from each other before the electrical heating element generates heat to trip the electrical over-current protection device, and
a protective layer covering the PTC conductive polymer layer and the resistive material layer, and exposing the first and second pairs of electrodes.

5. An electrical over-current protection device comprising:
an electrical component package having integrated therein
first and second pairs of electrodes, wherein the first pair of electrodes are electrically isolated from the second pair of electrodes, and the first pair of electrodes are located outward of the second pair of electrodes,
a thermally sensitive positive temperature coefficient (PTC) conductive element abutting the first pair of electrodes and having a low resistance state and a high resistance state, wherein the first and second pairs of electrodes remain electrically isolated from each other during both the low resistance state and the high resistance state, and
means for conducting current through the second pair of electrodes and generating heat that is transferred to trip the PTC conductive element, wherein the PTC conductive element entirely overlays the current conducting and heat generating means.

6. The device of claim 5 wherein the electrical component package is a surface mount package that consists essentially of said first and second pairs of electrodes, the PTC conductive element, and the current conducting and heat generating means.

7. The device of claim 5 wherein the electrical component package integrates the PTC conductive element with the current conducting and heat generating means so as to maximize heat transfer to the PTC conductive element.

8. The device of claim 5 or claim 6 wherein the current conducting and heat generating means is a layer of resistive material created on an electrically insulating substrate, wherein the substrate is thermally conductive and is between the PTC conductive element and the layer of resistive material.

9. An electrical over-current protection device comprising:
a component package having integrated therein
first and second pairs of electrodes, wherein the first pair is electrically isolated from the second pair,
a layer of thermally sensitive positive temperature coefficient (PTC) conductive polymer abutting the first pair of electrodes,
an electrical heating element abutting the second pair of electrodes, wherein the first and second pairs of electrodes are electrically isolated from each other before the electrical heating element generates heat to trip the electrical over-current protection device, and
a protective layer covering the PTC conductive polymer layer and the electrical heating element, and exposing the first and second pairs of electrodes.

10. The device of claim 9, wherein the electrical heating element comprises a resistive material layer.

11. The device of claim 10, wherein the resistive material layer is created on an electrically insulating substrate that is also thermally conductive and is between the PTC conductive polymer layer and the resistive material layer.

12. The device of claim 9, wherein the component package is a surface mount package.

13. The device of claim 4, wherein the component package is a surface mount package.

14. The device of claim 4, wherein the component package integrates the PTC conductive polymer layer with the electrical heating element so as to maximize heat transfer to the PTC conductive polymer layer.

* * * * *